(12) United States Patent
Pragada et al.

(10) Patent No.: US 8,700,624 B1
(45) Date of Patent: Apr. 15, 2014

(54) COLLABORATIVE SEARCH APPS PLATFORM FOR WEB SEARCH

(75) Inventors: Sreenivasa Rao Pragada, Irvington, NY (US); Viswanath Dasari, Alpharetta, GA (US); Abhijit Ashok Patil, Alpharetta, GA (US); Raju Venkata Rama Raju Gopala Gottumukkala, Cumming, GA (US); Kaliki Murthy Aritakula, Cumming, GA (US)

(73) Assignee: Semantifi, Inc., Stamford, CT (US)

( * ) Notice: Subject to any disclaimer, the term of this patent is extended or adjusted under 35 U.S.C. 154(b) by 76 days.

(21) Appl. No.: 13/211,615

(22) Filed: Aug. 17, 2011

Related U.S. Application Data

(60) Provisional application No. 61/374,634, filed on Aug. 18, 2010.

(51) Int. Cl.
*G06F 17/30* (2006.01)

(52) U.S. Cl.
USPC .......................................... 707/736; 707/706

(58) Field of Classification Search
USPC .......................................... 707/706, 723, 736
See application file for complete search history.

(56) References Cited

U.S. PATENT DOCUMENTS

| 2008/0104071 A1* | 5/2008 | Pragada et al. ................... 707/6 |
| 2009/0287657 A1* | 11/2009 | Bennett ............................. 707/3 |

* cited by examiner

*Primary Examiner* — Monica Pyo
(74) *Attorney, Agent, or Firm* — Gordon Kessler

(57) ABSTRACT

A system and method for searching for content. The method includes the steps of receiving a user query, determining one or more search apps that can answer the user query, employing each of the one or more search apps to query one or more content sources associated with each of the one or more search apps, ranking search results, corresponding to the one or more content sources, provided by the one or more search apps, and storing the ranked search results to a non-volatile computer readable storage medium.

20 Claims, 5 Drawing Sheets

| Key Technology | Web Pages | Datasets |
|---|---|---|
| Crawl | Keywords are Key | Structures are Key |
| Index | Popularity | Meaning / Relationships |
| Search | 2-3 Keywords | Elaborate Queries |
| Interpret | Listing of Links | Meaningful Summaries and Automatic Visuals |

| Key Technology | Web Pages | Datasets |
|---|---|---|
| Crawl | Keywords are Key | Structures are Key |
| Index | Popularity | Meaning / Relationships |
| Search | 2-3 Keywords | Elaborate Queries |
| Interpret | Listing of Links | Meaningful Summaries and Automatic Visuals |

FIGURE 1

COLLABORATIVE SEARCH APPS PLATFORM FOR WEB SEARCH

CROSS REFERENCE TO RELATED APPLICATIONS

This application claims the benefit of U.S. Provisional Patent Application Ser. No. 61/374,634, "Method and Apparatus for Delivering Knowledge Based Search Results" filed Aug. 18, 2010, currently pending, the entire contents thereof being incorporated herein by reference.

FIELD OF THE INVENTION

Embodiments of this invention relates generally to customized searching algorithms based upon the type of information to be searched, and more particularly to using one or more content focused search engines that are customized to operate in accordance with one or more particular content specific knowledge bases instead of using the same keyword search engine for all content.

BACKGROUND OF THE INVENTION

Searching for information on the World Wide Web can often become a very frustrating experience for users. A free form text search engine provides no help to a user regarding how to structure their search to find desired content. Thus, often users enter a search term or terms in a free form text box without any concern for the form of the data for which the user is searching. Results may provide an unmanageable number of irrelevant search results while potentially missing some of the most relevant information because of the format in which the information was stored or displayed on a hosted website. These are some of the major challenges with search web pages also referred as unstructured content.

Any such challenges with web search become much more apparent when it comes to searching structured data also known as the "Deep Web". The Deep Web comprises a vast set of content hidden inside a multitude of databases, each stored in a format that may be unknown, and different from the storage format of any other database. According to the University of California, Berkley estimates place the size of Deep Web at over 500× the amount of content currently contained in all of the currently existing Internet of web pages, also called the surface web.

While there are a number of current approaches that attempt to search the Deep Web using automated crawlers and keyword searches, they have many challenges. This is because, in general, search technology that works for web pages or unstructured content does not translate for structured data. As is shown in FIG. 1, keyword search engines for searching for data contained in web pages primarily 1) crawl web pages where keywords are searched and captured, 2) organize content based upon the popularity of content, 3) match the content to any small number of keywords, and 4) present links to web pages that match the keywords from a user query.

In contrast, as has been recognized by the inventors of the present invention, the requirements for searching through the structured Deep Web are quite different. In crawling such Deep Web data, 1) understanding structure of the dataset is more important than capturing keywords. 2) In composing queries to retrieve data, knowledge of the structure of a dataset being searched and recognition of data fields and their inter-relationships is critical; popularity doesn't help in presenting relevant answers as this data is typically not subject to popularity determinations. 3) When querying such Deep Web data, users tend to ask elaborate queries unlike 2-3 keywords when searching web pages. Therefore, understanding the meaning of user queries is critical. Simply employing a keyword-to-keyword correlation does not suffice. 4) Lastly, when interpreting results from data, users expect meaningful summaries and visuals of data not links to detailed records of the datasets—as it would be if technology of web pages were to be translated on to data search. In short, knowledge base specific to content, understanding a user's complex queries and relationships between the query terms, and finally matching them both meaningfully to present relevant answers are important in understanding and delivering the content contained in the Deep Web.

Prior solutions to search web data are either are not knowledge base driven or cannot practically scale to the vast Deep Web.

Google®, Microsoft®, Kosmix™, DeepPeep™, Deep-Dyve™, Socrata™ Infochimps™, Data.gov and many others have been trying to implement methods for searching the Deep Web. Each has different technologies, tools, and most importantly very different approaches, as will now be described.

Automated Crawlers to Peek-thru Web Forms or APIs to search Underlying Databases. This approach focuses on searching datasets behind HTML forms, and thus excluding from web Search a vast majority of datasets that do not have forms in front of them. For example, if one is looking to buy a car, one might visit Edmunds.com and fill the search form by selecting the Manufacturer, Model, Price Range, Zip Code, etc. The information filled into the form is used to compose a database query which is then submitted to the one or more databases to present the results as an HTML page. Because this page is created on demand current search engine can't see the page.

Google®'s approach to the Deep Web is to find HTML forms, send input to these forms, and index the resulting HTML pages. Google®'s approach is fully automated, can easily scale and fits nicely with its infrastructure built for searching web pages. A more indepth discussion of this approach is included at Alon's VLDB paper published in 2008. Kosmix™ takes a similar approach of tapping into web forms as Google®, but does so by using API calls instead. DeepPeep™ follows a similar approach of tapping into web forms to search underlying databases.

While this approach offers some benefits, it has severe limitations in the scope of content that can be searched and level of analytics that can be conducted. Given the simplicity of this approach, it can be easily scaled to a large number of Web Forms or APIs. This approach, however, leaves out a huge portion of the Deep Web comprising of datasets that do not have a Form or API in front of them as is the case with many government, finance, research, or other similar datasets on the web. Additionally, forms & APIs offer only a limited window into the underlying databases, and hence allow only simple queries but not advanced analytics.

Powerset™, Hakia™, Kosmix™, Wolfram Alpha™ and others use knowledge bases to search content but anyone from the community cannot make their datasets searchable for other users on the web. These approaches depending on internally built taxonomies, knowledge bases, etc. can be applied to limited content but cannot be scaled to the billions of web pages and datasets.

Therefore, it would be desirable to provide an apparatus, method, system and solution that overcomes the drawbacks of the prior art and allows for efficient and effective searching of all of the Web.

SUMMARY OF THE INVENTION

Embodiments of this invention relate generally to customized searching algorithms based upon the type of information to be searched, and more particularly to using one or more content focused search engines that are customized to operate in accordance with one or more particular content specific knowledge bases instead of using the same keyword search engine for all content. In accordance with an embodiment of the invention, a technology platform may be provided where content focused knowledge driven search engines called "Search Apps" may be built, preferably by anyone in a community. When building such search apps, publishers may be able to package three components: content, knowledge base specific to that content, and knowledge base driven search engine. Through the use of such generated search apps, searchers may ask simple questions and get relevant knowledge based search results from data contained in the Deep Web, preferably with automatic presentations utilizing charts, tables, grids, maps, etc. and the like as appropriate based upon the structure of the content being searched.

Retrieving relevant search results is the biggest challenge with keyword search engines. Knowledge base (knowing one or more characteristics of the data being searched) is important to retrieving relevant search results when the data is voluminous and may be stored in any number of different formats. It may not be practical for any one entity to have all the knowledge of the potentially nearly limitless number of Web Pages & Datasets. However, in accordance with an embodiment of the invention, anyone with knowledge of the format of any particular specific content may be enabled to build a Search App specifically dedicated to allowing others to search that content. Therefore, this system and method in accordance with an embodiment of the present invention may allow a community to meaningfully wire the web, designing one Search App at a time.

While search engines, or search pages have been generated to search through a specific database or dataset, in accordance with an embodiment of the invention, through the ability to allow users to build individual Search Apps, the cumulative group of users can together generate sufficient Search Apps directed to any number of available datasets, thereby allowing access for others to the data stored in the Deep Web. The challenge addressed in accordance with the invention is that is no one entity has all the knowledge of the world or knowledge of the billions of web pages, datasets, etc. that comprise the web today, or that may be made available in the future. Therefore, in accordance with an embodiment of the invention, a platform is provided where anyone with knowledge of, and access to, specific content can package that content, the knowledge base specific to that content and a knowledge base driven search engine (comprising a dedicated Search App). Through the use of such a Search App to search for data in the associated dataset, relevant/meaningful/knowledge-based search results may be retrieved from that content. If many such focused search engines (Search Apps) can be built covering a broad spectrum of content, then knowledge base search becomes possible on a broad scale, further allowing access to all of the information stored in the Deep Web, regardless of format and location.

Therefore, in accordance with various embodiments of the invention, a platform is provided allowing and providing knowledge based relevant search results through community built Search Apps as opposed to automated machine crawlers and keyword search engines. The community at large is empowered to generate and publish content focused Search Apps relating to particular datasets, thus resulting in a grouping of available Search Apps that may be used by any number of other people. In accordance with embodiments of the invention, anyone can publish a Search App, and these Apps can be shared publicly or within groups. Search Apps can be shared for free, or can require a fee for use, either as payment to the Search App author, or as a fee for access to the underlying dataset. This revenue may be shared in any number of ways. Using these Search Apps, it is anticipated that users can search via simple questions or keywords to get knowledge based search results from desired datasets, and interpret those results via many presentations such automatically generated charts, tables, listings, grids, maps, etc.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 1 is a table depicting feature requirement difference between searching the web with keyword search engines, and searching the deep web using knowledge based search strategies;

DETAILED DESCRIPTION OF THE PREFERRED EMBODIMENTS

Figure 2:
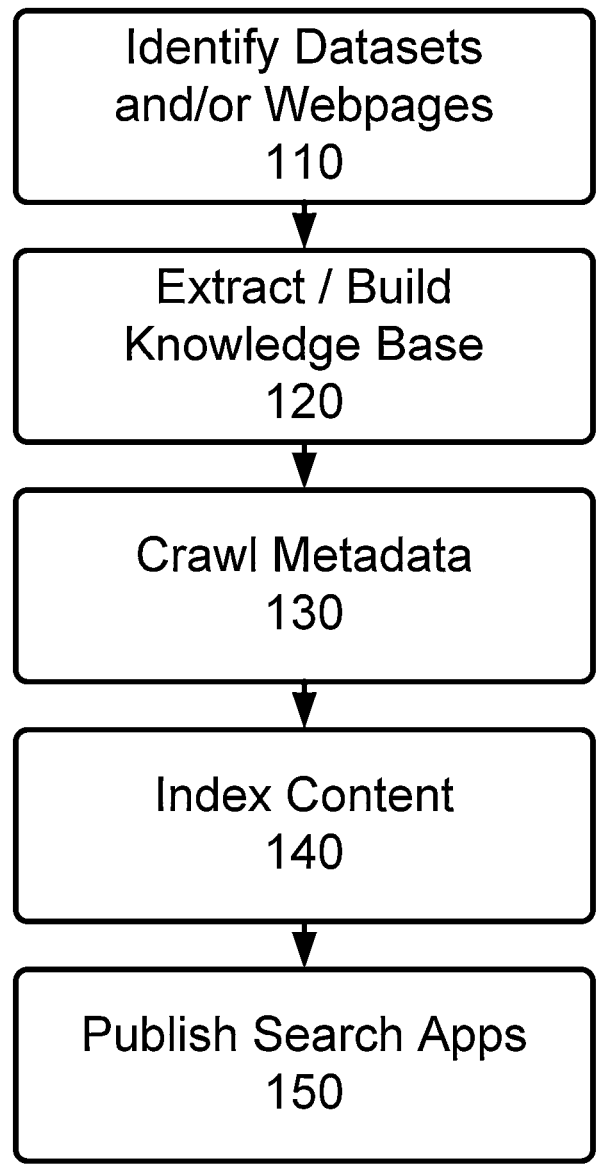
FIG. 2 is a flowchart diagram depicting a method for defining one or more Search Apps in accordance with an embodiment of the invention.

The invention will now be described making reference to the following drawings in which like reference numbers denote like structure or steps. Referring to FIG. 2, a flowchart diagram is provided, depicting the steps in accordance with an embodiment of the invention, for generating and publishing a Search App. As is shown in FIG. 2, first as step 110 a particular dataset, group of one or more web pages, or other data content is defined and made available for access by a Search App. This dataset may be copied to a location associated with the platform of the invention allowing for the generation and implementation of various Search Apps, or may be maintained in its current location, providing a pointer or other indication of location of the dataset. Then, at step 120, a knowledge base describing the structure of the data is extracted. This extraction process may preferably comprise an analysis sub system that reviews the dataset for various common characteristics, grouping elements, or other common and searchable features of the dataset, or may look up existing metadata related to the dataset which may define one or more features of the dataset, as shown in step 130. Once extracted, various searchable categories of information may be defined, and therefore may be provided as one or more search criteria in accordance with one or more to be generated Search Apps.

Once the dataset has been defined, and the knowledge base has been extracted, at step 140 the content of the dataset may be indexed in accordance with the extracted knowledge base and metadata in order to provide quicker and easier access to the data. Such indexing may be particularly useful in situations in which there are a large number of dimensions on which a Search App may provide the ability for a user to search, or if the data is quite voluminous so that any search looking through each data entry would result in a prohibitively long search.

Finally, at step 150, a Search App may be published that allows others to access and search for information within the defined dataset.

Figure 3:
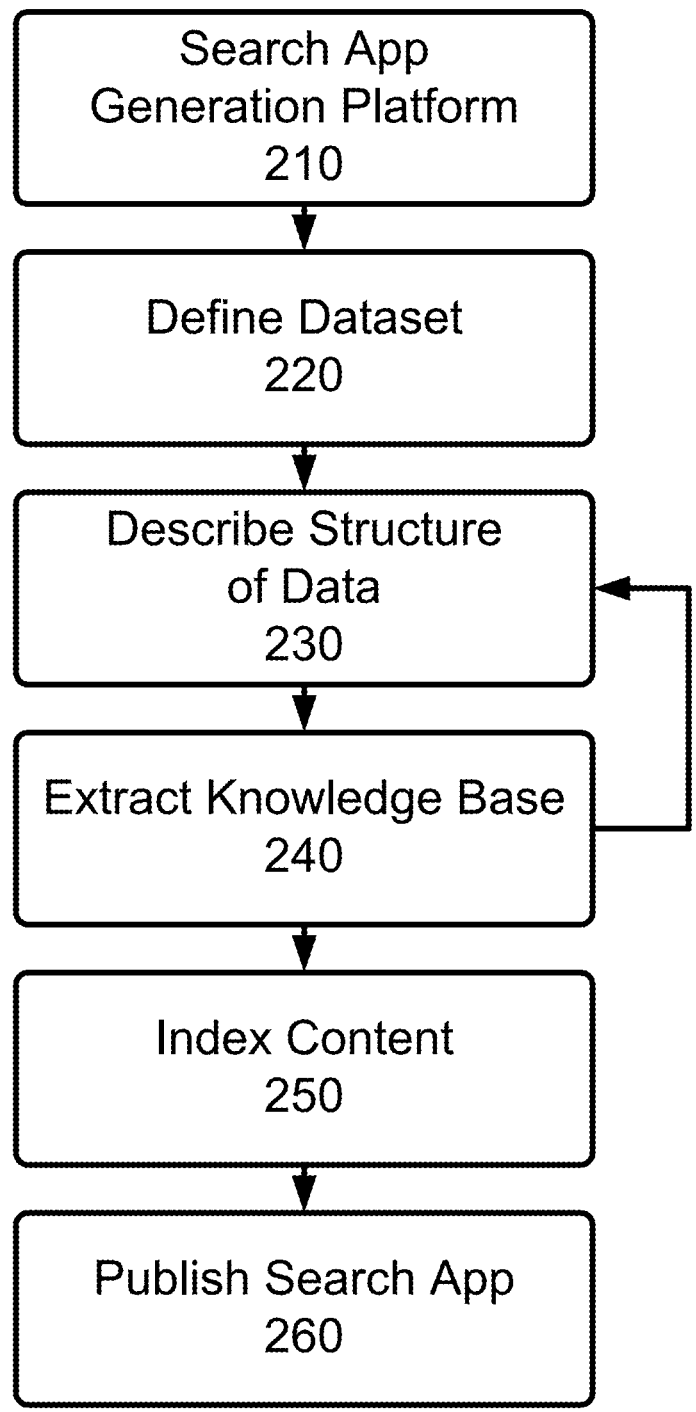
FIG. 3 is a flowchart diagram depicting a method for defining and publishing a Search App in accordance with an embodiment of the invention.

It is anticipated in accordance with an embodiment of the invention that one or more authors may publish such Search Apps, and indeed, it is this ability to provide a platform for easy and consistent generation of Search Apps that comprises an embodiment of the invention. Therefore, as is shown in FIG. 3, a publisher first visits a common Search App generation platform at step 210. At step 220, the publisher is requested to define one or more datasets to which the Search App may apply. These datasets may comprise any grouping of data. A copy of such data or a link indicating the location of such data may be provided to the Search App generation platform so that the Search App, and any associated extraction and/or indexing algorithms have access to the data (as will be described below).

At step 230 the publisher is requested to provide any available level of detail that may be available about the data in the dataset, and preferably information that may not be available in the dataset. Then at step 240, one or more bits of information related to the data may be extracted from the data. Thus, in accordance with an embodiment of the invention, and as described above, one or more common features of various data entries may be recognized, thus providing a dimension upon which a search may rely. Upon extraction of such data, if any ambiguity of the identity of such extracted data, processing may return to step 230, and the publisher may be requested to confirm the status of particular extracted knowledge base data.

After all knowledge base data has been extracted (including, as noted above, any included pre-existing metadata), processing passes to step 250 where the content of the data set is indexed in accordance with the extracted knowledge base. Finally, at step 260, the Search App may preferably be published for others to use.

Figure 4:
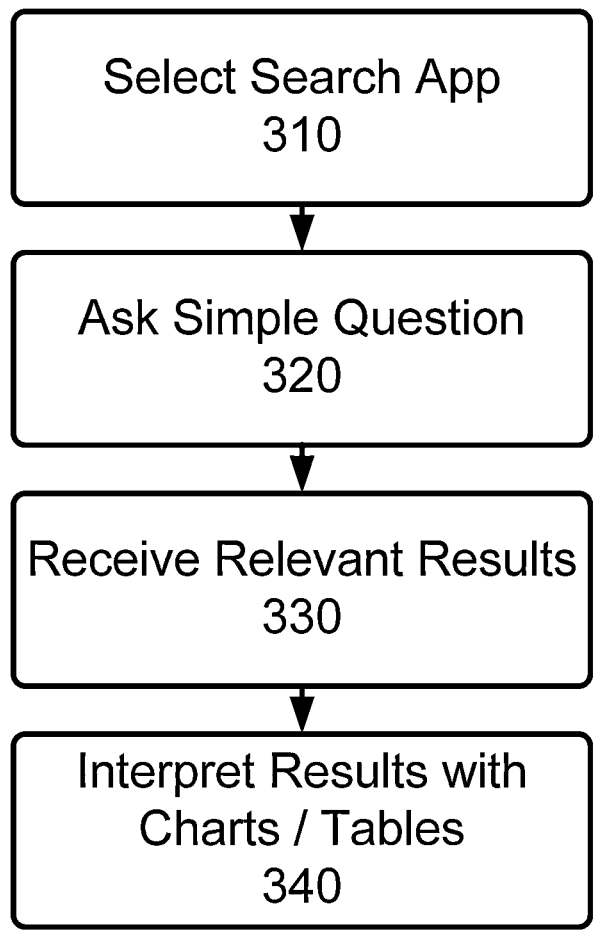
FIG. 4 is a flowchart diagram depicting a method for using a Search App in accordance with an embodiment of the invention.

Upon publication, a user may employ the published Search App to perform a search, as shown in FIG. 4. As is shown, a user first selects a desired Search App, associated with a particular dataset, at step 310. Next, at step 320, the user asks a simple question of the Search App. And indeed, this is one of the features of the invention that makes the platform and system desirable: the user need only ask a simple question through the published Search App. Parsing and understanding of the question is performed by the platform and the determined desired search is applied to the dataset, as indexed in accordance with the invention.

At step 330, relevant search results are provided to the user, and at step 340, various charts and table may be viewed by the user as applied to the relevant search results. Each of the suggested tables and charts are formatted in accordance with the structure of the data underlying the received search results.

Such a common Search App generation platform may provide a set of underlying functional modules, thus allowing for ease in Search App generation and use, and in the ability to perform complex searches on a large amount of data through the asking of simple, language based questions. In particular, in accordance with an embodiment of the invention, such a platform preferably provides one or more of the following features that may be employed in the process of Search App generation, operation and user by a publisher or user.

One of the major capabilities of humans over machines is the ability to work with less than perfect information. Machines can process exact inputs and deliver exact answers—the exception is often due to a defect which may not the intent or design. This capability is also referred to as satisficing, a "handy blended word combining satisfy with suffice", is a decision-making strategy that attempts to meet criteria for adequacy, rather than to identify an optimal solution—in short, satisficing is to identify a "good enough" solution. The platform will provide a mechanism for choosing good-enough inputs from an order set of possible inputs to make decisions based on those inputs, as is more fully described U.S. Provisional Patent Application Ser. No. 61/374,632, "Method Universal Satisficing Mechanism", filed Aug. 18, 2010, and U.S. patent application Ser. No. 13/163,709, "Method and Apparatus for Providing a Set of Answers from an Ordered or Unordered Set of Possible Answers, filed Jun. 19, 2011, the entire contents of these documents being incorporated herein by reference.

Search Engine

A search engine preferably matches user queries to available content to present relevant search results. For knowledge based search results, a search engine capable of A) recognizing user queries and search content based on knowledge base is preferred. An example of such a search engine is shown in U.S. patent application Ser. No. 11/929,734, "System and Method for Converting a Natural Language Query Into a Logical Query", filed Oct. 30, 2007, currently pending, the entire contents thereof being incorporated herein by reference. User query results are preferably recognized in a conceptual representation of the user query. Similarly, search content may be crawled with the help of knowledge base to extract a conceptual representation of the content. B) Matching the conceptual representations of the user query and the search content as described in U.S. Provisional Patent Application Ser. No. 61/374,595, "Method and Apparatus for Storing Ontologies in a Relational Database", filed Aug. 17, 2010, U.S. patent application Ser. No. 13/211,535, titled "Knowledge Framework" filed Aug. 17, 2011, U.S. patent application Ser. No. 13/211,564, titled "Method and Apparatus for Storing Ontologies in a Relational Database" filed Aug. 17, 2011, and U.S. patent application Ser. No. 13/210,409, titled "Method and Apparatus for Indexing and Querying Knowledge Models", filed Aug. 16, 2011, the entire contents of these documents being incorporated herein by reference, and C) ranking them based on the level of match is employed to show knowledge based relevant search results as described in U.S. Provisional Patent Application Ser. No. 61/374,596, "Universal Ranking Mechanism: Method for Ranking Search Results with or without knowledge base for structured or unstructured content", filed Aug. 17, 2010, and U.S. patent application Ser. No. 13/210,402, titled "Universal Ranking Mechanism: Method and Apparatus for Ranking Search Results with or without knowledge base for structured or unstructured content" filed Aug. 16, 2011, the entire contents of these documents being incorporated herein by reference.

Content

Underlying content of a dataset may comprise either structured content such as databases, linked data, Excel, CSV, data cubes, etc. or unstructured content such as web pages, blogs, images, video, etc. Content of each dataset can be stored on the platform or distributed on the web openly or behind firewalls. Content should be maintained in a query-able storage such as a database. Access/authorization is required for the search engine to query the content sources.

Knowledge Base

Knowledge base comprises bits and pieces of information that is connected. Knowledge is made up of knowledge models and knowledge index. Knowledge models are essentially graphs describing how knowledge base entities are connected. Knowledge index is a collection of many indices such as synonyms, abbreviations, acronyms, formulae, conversion rules, linguistic roots, etc. Knowledge indices help in recognizing many variations of knowledge entities. For instance, a query "Shops with 100 yards" can be recognized as the same as "Shops within 300 feet" based on the knowledge index of conversion rules and the specific rule which explains that "1 Yard=3 Feet". The job of a search engine is to understand user query or search content using knowledge base. Knowledge models and Knowledge index can be specific to content or universal. Universal knowledge base, as the name suggests, is common to all content. Content specific knowledge base is limited to that content only. It can be extracted out of content automatically (also referred to as machine extraction of metadata) or manually built by subject matter experts.

Knowledge base of structured content can be extracted as described in U.S. Provisional Patent Application Ser. No. 61/374,631, "Metadata Extraction of Structured Content", filed Aug. 18, 2010, and U.S. patent application Ser. No. 13/210,400, titled "Semantic Metadata Extraction", filed Aug. 16, 2011, the entire contents of these documents being incorporated herein by reference, and may employ one or more features of the above noted '734 application. Relationship between Knowledge base and content can be many-to-many. Multiple knowledge bases can represent/describe any specific content and one knowledge base can represent/describe many content sources. The platform in accordance with an embodiment of the invention will be able to store and retrieve knowledge base for the search engine, recognize user queries, and search content as described in the '595 Provisional Application, described above. The knowledge bases will cross-linked to minimize duplication without impact on search results as in the above application. The knowledge base of the search engine and the conceptual knowledge extracted from unstructured content can be combined to minimize storage and improve performance as described in the applications noted above.

Query Federation

User query is preferably federated to available content sources via content specific query adapters. The query adapters ensure that the correct querying procedures are followed specific to any given systems or database holding the content.

Semantic Web Index

To deliver immediate search results from structured and unstructured content the platform will employ many indices including but not limited to Index of knowledge base: Knowledge bases are essentially graphs and traversing large number of graphs can be time consuming and can take progressively more time with more graphs or larger graphs. The platform will employ graph index capability to deliver predictable performance irrespective of number of graphs or size of graphs as described in the '595 Provisional Application, discussed above.

Index of conceptual knowledge representation of unstructured content as described in the above application.

Index of conceptual knowledge representation of structured content as described in the above application.

Answers catalogs of structured data as described in U.S. patent application Ser. No. 11/929,789, "System and Method for Distributing Queries to a Group of Databases and Expediting Data Access", filed Oct. 30, 2007, currently pending, the entire contents thereof being incorporated herein by reference.

Keyword index of unstructured content also commonly referred to as web index. This is primarily a listing of all keywords from the content with links to content sources. Additional information such as number of hits representing popularity of content may be captured in a web index for better ordering of search results.

Index of query cache can help improve performance by showing cached answers when cache is as fresh as the source content.

User Interface

The user interface may be provided as a search bar or a detailed search request form allowing users to compose a query. Commonly used tools such as auto-suggesting terms as users type the query, related queries may also be employed in accordance with this embodiment of the invention. In a preferred embodiment of the invention, an advanced search prom may be provided to the user. Such search form is universal in that the user may employ such a form regardless of the type of dataset to be searched, and regardless of how the data is stored or indexed. Of course, for particular, dedicated Search Apps associated with particular content, a dedicated search form may be more efficient and easier for a user to employ.

Results Presentation

The invention will present results in multiple formats automatically depending on the content. For structured content, the platform can dynamically aggregate detailed data and show automatic visuals as charts, tables, maps, etc. as described in patent application Ser. No. 11/929,519, "A Domain Independent System and Method of Automating Data Aggregation and Presentation", filed Oct. 29, 2007, the entire contents thereof being incorporated herein by reference.

For unstructured content, the invention may dynamically group knowledge base entities and present results clustered by those entities. The presentations may vary depending on content. By way of example only, travel reservations may be shown as side-by-side listings of departure and arrivals. Product shopping results may be shown as a matrix/grid. Results for nearby ATMs could be shown on a map, etc. Unstructured content may be dynamically grouped as described in U.S. Provisional Patent Application Ser. No. 61/374,592, "Method and Apparatus for Dynamic Grouping of Unstructured Content", filed Aug. 17, 2010, and U.S. patent application Ser. No. 13/163,710, "Method and Apparatus for Dynamic Grouping of Unstructured Content", filed Jun. 19, 2011, the entire contents of these documents being incorporated herein by reference, which is a built upon the '519 application noted above. For unstructured content to be dynamically grouped, the conceptual representation of the unstructured content may be passed as a structured dataset input to a dynamic aggregation system, such as that described in the '519 application noted above.

Figure 5:
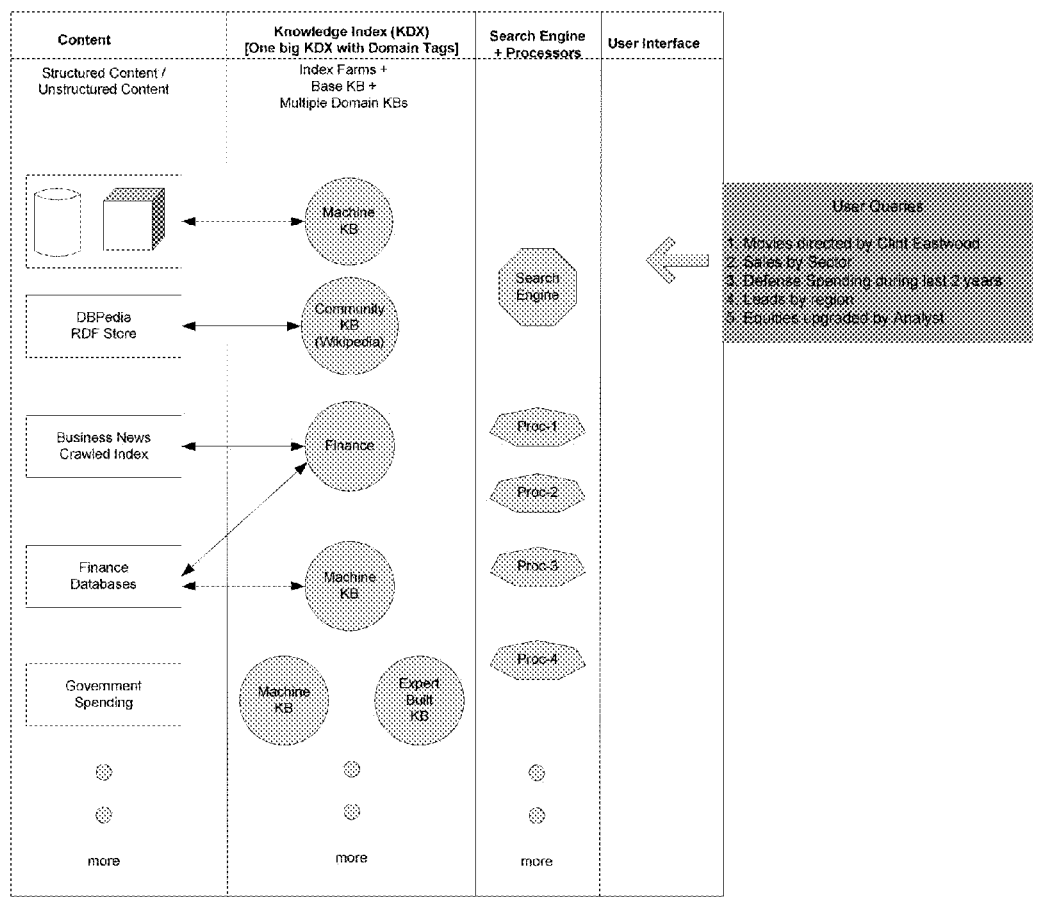
FIG. 5 is a representation of a platform view in accordance with an embodiment of the invention

FIG. 5 depicts a platform view of an embodiment of the invention. As shown in FIG. 5, one or more sources of structured or unstructured content are shown. These sources of content may in turn be associated with one or more knowledge bases. Furthermore, one or more Search Apps may be generated associated with one or more of the noted knowledge bases. In accordance with the invention, one or more of these search apps and associated knowledge bases and associated content may be generated or designated by one or more individuals making up a community. Finally, a user may enter one or more simple queries, using a particular Search App, in order to address a particular knowledge base and associated content.

Variations:

A platform NOT using KB Search is a variation of the application described here. In the absence of any knowledge base the results will be matched by keywords.

Various aspects of the invention may be applied even if knowledge based search is not available. Thus, the inventive ideas of community based generation of search applications may also be applied to more generic type keyword searching. Availability of customization of search applications may also be provided to match searched content, even if such customization may be provided by the user, and is not based on knowledge base data extraction.

Embodiments of the present invention may be employed on various appropriate computer systems, providing sufficient computing power and storage means. Access to such computing system may be provided to one or more users in any manner, such as via a web portal, direct connection, or other access.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed is:

1. A method of making content searchable, comprising the steps of:
    generating, by one or more publishers, one or more search apps, each of the one or more search apps being generated by:
        defining one or more content sources;
        extracting one or more knowledge bases from each of the one or more content sources;
        defining on or more searchable categories of information associated with each of the one or more extracted knowledge bases; and
        indexing the information of the one or more content sources in accordance with the one or more searchable categories of information;
    accumulating the one or more search apps generated by the one or more publishers and storing the accumulated one or more search apps to a computer readable, non-transitory storage medium;
    providing a query entry system for receiving a user query; and
    answering the user query in accordance with the one or more search apps by determining one or more of the one or more data sources most likely to answer the user query, and performing the search in accordance with one or more of the one or more search apps retrieved from the computer readable, non-transitory storage medium associated with the determined one or more data sources.

2. The method of claim 1, wherein the step of generating the one or more search apps comprises the steps of:
    presenting a location of one or more of the one or more content sources; and
    defining one or more display elements for interpreting and displaying information associated with a corresponding one or more content sources.

3. A method for searching for content, comprising the steps of:
    receiving a user query;
    determining one or more search apps that can answer the user query each of the one or more search apps being generated by:
    defining one or more content sources;
    extracting one or more knowledge bases from each of the one or more content sources;
    defining on or more searchable categories of information associated with each of the one or more extracted knowledge bases; and
    indexing the information of the one or more content sources in accordance with the one or more searchable categories of information;
    storing the one or more search apps to a computer readable non-transitory storage medium;
    employing each of the one or more search apps stored to the computer readable non-transitory recording medium to query one or more of the one or more content sources associated with each of the one or more search apps;
    ranking search results, corresponding to the one or more of the one or more content sources, provided by the one or more search apps;
    storing the ranked search results to the non-transitory computer readable storage medium.

4. The method of claim 3, further comprising the step of providing information corresponding to the one or more of the one or more content sources returned as a ranked search result.

5. The method of claim 4, wherein the information comprises one or more automatically generated visual presentations.

6. The method of claim 4, wherein the information is provided in accordance with one or more designated user preferences.

7. The method of claim 3, wherein the step of determining the one or more search apps that can answer the user query is performed by matching a knowledgebase representation of the user query and a knowledge base representation of the search app.

8. The method of claim 7, wherein the knowledgebase representation of the search app is generated in accordance with one or more knowledgebase representations of one or more content sources associated therewith.

9. The method of claim 3, wherein a user submitting the user query may indicate one or more of location of content, structure of content, method of querying the content, and search app to be employed.

10. A computer program stored to a non-transitory computer medium, the computer program causing a general purpose computer to perform the steps of:
    generating, by one or more publishers, one or more search apps, each of the one or more search apps being generated by:
        defining one or more content sources;

extracting one or more knowledge bases from each of the one or more content sources;

defining on or more searchable categories of information associated with each of the one or more extracted knowledge bases; and indexing the information of the one or more content sources in accordance with the one or more searchable categories of information;

accumulating the one or more search apps generated by the one or more publishers; and providing a query entry system for receiving a user query; and answering the user query in accordance with the one or more search apps by determining one or more of the one or more data sources most likely to answer the user query, and performing the search in accordance with one or more of the one or more search apps associated with the determined one or more data sources.

11. The computer program of claim 10, wherein the step of generating the one or more search apps comprises the steps of:

presenting a location of one or more of the one or more content sources; and defining one or more display elements for interpreting and displaying information associated with a corresponding one or more content sources.

12. A computer program stored to a non-transitory computer medium, the computer program causing a general purpose computer to perform the steps of:

receiving a user query;

determining one or more search apps that can answer the user query each of the one or more search apps being generated by:

defining one or more content sources;

extracting one or more knowledge bases from each of the one or more content sources;

defining on or more searchable categories of information associated with each of the one or more extracted knowledge bases; and indexing the information of the one or more content sources in accordance with the one or more searchable categories of information;

employing each of the one or more search apps to query one or more of the one or more content sources associated with each of the one or more search apps;

ranking search results, corresponding to the one or more of the one or more content sources, provided by the one or more search apps;

storing the ranked search results to a non-volatile computer readable storage medium.

13. The computer program of claim 12, further comprising the step of providing information corresponding to the one or more of the one or more content sources returned as a ranked search result.

14. The computer program of claim 13, wherein the information comprises one or more automatically generated visual presentations.

15. The computer program of claim 13, wherein the information is provided in accordance with one or more designated user preferences.

16. The computer program of claim 12, wherein the step of determining the one or more search apps that can answer the user query is performed by matching a knowledgebase representation of the user query and a knowledge base representation of the search app.

17. The computer program of claim 16, wherein the knowledgebase representation of the search app is generated in accordance with one or more knowledgebase representations of one or more content sources associated therewith.

18. The computer program of claim 12, wherein a user submitting the user query may indicate one or more of location of content, structure of content, method of querying the content, and search app to be employed.

19. A system for making content searchable, comprising the steps of:

an input device for receiving instructions from one or more publishers defining one or more search apps for searching one or more content sources each of the one or more search apps being generated by:

defining one or more content sources;

extracting one or more knowledge bases from each of the one or more content sources;

defining on or more searchable categories of information associated with each of the one or more extracted knowledge bases; and indexing the information of the one or more content sources in accordance with the one or more searchable categories of information;

a query entry system for receiving a user query; and a processor for accumulating the one or more search apps, and for answering the user query in accordance with the one or more search apps by determining one or more of the one or more data sources most likely to answer the user query, and performing the search in accordance with one or more of the one or more search apps associated with the determined one or more data sources.

20. The system of claim 19, wherein the generating the one or more search apps comprises:

presenting a location of one or more of the one or more content sources; and defining one or more display elements for interpreting and displaying information associated with a corresponding one or more content sources.

* * * * *